(12) United States Patent
Walkingshaw et al.

(10) Patent No.: US 8,640,798 B2
(45) Date of Patent: Feb. 4, 2014

(54) MOTORIZED SLED FOR STAIR CHAIRS

(75) Inventors: Nathan R. Walkingshaw, Bountiful, UT (US); Mark Wenzel, Sandy, UT (US)

(73) Assignee: Stryker Corporation, Kalamazoo, MI (US)

( * ) Notice: Subject to any disclaimer, the term of this patent is extended or adjusted under 35 U.S.C. 154(b) by 616 days.

(21) Appl. No.: 12/550,016

(22) Filed: Aug. 28, 2009

(65) Prior Publication Data

US 2010/0117312 A1   May 13, 2010

Related U.S. Application Data

(60) Provisional application No. 61/093,162, filed on Aug. 29, 2008.

(51) Int. Cl.
*A61G 5/04* (2013.01)
*B62D 55/04* (2006.01)

(52) U.S. Cl.
USPC .................. 180/9.32; 280/5.22; 280/5.24

(58) Field of Classification Search
USPC ............ 180/9.28, 9.32, 11, 15, 16; 280/5.22, 280/5.24, DIG. 10
See application file for complete search history.

(56) References Cited

U.S. PATENT DOCUMENTS

| | | | |
|---|---|---|---|
| 787,472 A | 4/1905 | Schuster et al. | |
| 2,493,613 A | 1/1950 | Bortnick | |
| 3,111,331 A | 11/1963 | Locke | |
| 3,276,531 A | 10/1966 | Hale et al. | |
| 3,713,501 A * | 1/1973 | Hurt | 180/9.22 |
| 4,033,421 A * | 7/1977 | Ikarimoto | 180/8.2 |
| 4,044,850 A * | 8/1977 | Winsor | 180/9.26 |
| 4,062,418 A * | 12/1977 | Misawa | 180/8.2 |
| 4,136,888 A | 1/1979 | Bowie, Jr. et al. | |
| 4,168,554 A | 9/1979 | Hindes | |
| 4,401,178 A | 8/1983 | Studer | |
| 4,473,234 A * | 9/1984 | Egen | 280/5.22 |
| 4,585,241 A | 4/1986 | Misawa et al. | |
| 4,962,941 A * | 10/1990 | Rembos | 280/5.22 |

(Continued)

FOREIGN PATENT DOCUMENTS

| | | |
|---|---|---|
| JP | 2002-085476 | 3/2002 |
| JP | 2002-178930 | 6/2002 |

OTHER PUBLICATIONS

PCT Search Report for corresponding PCT Application No. PCT/US2009/055398 mailed Apr. 1, 2010.

*Primary Examiner* — Anne Marie M Boehler
(74) *Attorney, Agent, or Firm* — Warner Norcross & Judd LLP

(57) ABSTRACT

A lightweight motorized and tracked sled for attachment to a variety of stair chairs is described. A power supply or power source provides power to a motor driving a track configured to engage a set of stairs. The motor and track can lift and support the stair chair and a patient thereon up or down one or more flights of stairs. The track driven by the motor has a length sufficient to simultaneously engage the lips or edges of a pair of sequential steps, but may be otherwise limited in length to reduce the weight of the track. To ensure that the sled and attached stair chair are stably supported while ascending or descending stairs, the sled may have rails, skis, or passive tracks having a length sufficient to ensure that the rails, skis, or passive tracks are always over the edge or lip of no fewer than two steps.

18 Claims, 12 Drawing Sheets

(56) References Cited

U.S. PATENT DOCUMENTS

| | | |
|---|---|---|
| 5,023,968 A | 6/1991 | Diehl et al. |
| 5,158,309 A | 10/1992 | Quigg |
| 5,338,048 A | 8/1994 | Medina |
| 5,423,563 A * | 6/1995 | Wild .................. 280/250.1 |
| 5,868,403 A | 2/1999 | Culp et al. |
| 6,561,524 B1 | 5/2003 | Medina |
| 6,942,226 B2 | 9/2005 | Walkingshaw |
| 7,124,454 B2 | 10/2006 | Walkingshaw |
| 7,125,022 B2 | 10/2006 | Medina |
| 2003/0132585 A1 * | 7/2003 | Way et al. ................ 280/5.22 |
| 2004/0206555 A1 | 10/2004 | Schneider |
| 2006/0037789 A1 * | 2/2006 | Kritman et al. ............ 180/9.32 |
| 2006/0185079 A1 | 8/2006 | Walkingshaw |
| 2006/0195987 A1 | 9/2006 | Walkingshaw |
| 2007/0095581 A1 | 5/2007 | Chambliss et al. |
| 2007/0182220 A1 | 8/2007 | Walkinshaw et al. |
| 2008/0067762 A1 | 3/2008 | Rembos et al. |
| 2008/0272629 A1 | 11/2008 | Walkingshaw et al. |
| 2008/0296853 A1 * | 12/2008 | Langford et al. ........... 280/5.22 |
| 2009/0000027 A1 | 1/2009 | Jarrett, III |

\* cited by examiner

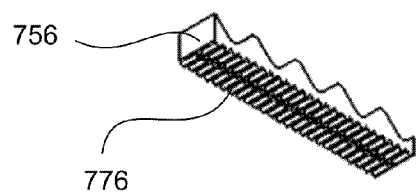 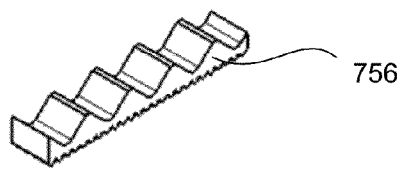
FIG. 9  FIG. 10
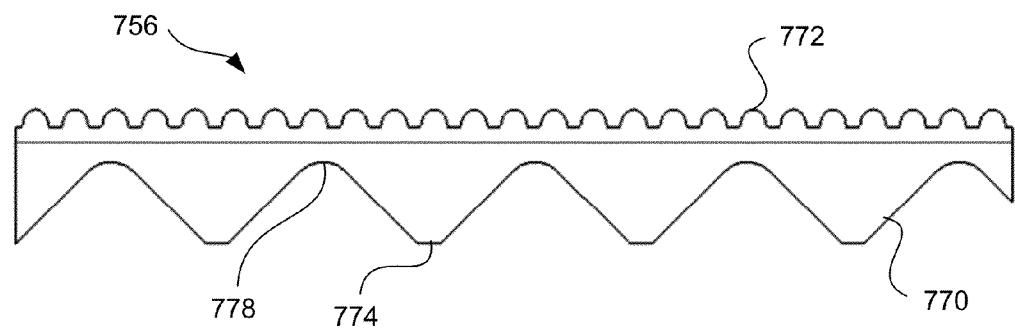
FIG. 11

MOTORIZED SLED FOR STAIR CHAIRS

CROSS-REFERENCE TO RELATED APPLICATIONS

This application claims the benefit of U.S. Provisional Application Ser. No. 61/093,162, filed Aug. 29, 2008 in the names of Nathan R. Walkingshaw and Mark Wenzel and titled "Motorized Sled for Stair Chairs."

BACKGROUND OF THE INVENTION

1. Field of the Invention

The present invention relates to stair chairs, and more particularly to a motorized sled for attachment to stair chairs to convert stair chairs into powered stair chairs for power-assisted stair ascents and descents.

2. Background and Related Art

Stair chairs are commonly used to maneuver patients in a variety of situations. Such situations include emergency response situations and evacuations of multi-level buildings. Stair chairs are typically designed to permit rolling movement of a patient or evacuee over flat surfaces and carrying of the stair chair up or down flights of stairs or over rough surfaces. Manufacturers of such chairs include Stryker Corporation of Kalamazoo, Mich. and Ferno-Washington, Inc. of Wilmington, Ohio. An illustrative stair chair 10 is shown in perspective view in FIG. 1.

The stair chair 10 includes rear bearings, typically wheels or casters 12, which permit the stair chair 10 to be rolled across a flat surface. In some stair chairs, no front wheels or casters are provided, and to roll the stair chair 10 across a surface, the user is expected to tip the stair chair 10 backward slightly until substantially all the weight of the stair chair 10 and a patient or evacuee thereon is over the rear wheels 12. In other instances, the stair chair 10 is provided with front casters 14, which permits rolling of the stair chair 10 without any tipping. The rear wheels 12 and the front casters 14 (if any) are typically attached to a chair frame 16. The chair frame 16 provides various support elements to support a patient or evacuee, such as a foot rest 18, a seat 20, and a back 22. For convenience in describing the stair chair 10, the chair frame 16 has been illustrated without any padding elements or other support surfaces for the seat 20 and the back 22.

The stair chair 10 may fold, such as at hinges 24, to make the stair chair 10 more compact for storage. The stair chair 10 may also be provided with handles 26 to assist responders in carrying the stair chair 10 up or down stairs or in otherwise moving the stair chair 10. The handles 26 nearest the foot rest 18 may be extendable so the responders or other users may more easily carry the stair chair 10 up or down stairs. When carried by the handles 26, the stair chair 10 is typically tipped back slightly so that the user at the foot of the stair chair 10 may stand upright while carrying the stair chair 10.

Stair chairs 10 are very useful in evacuating or otherwise moving patients or other people unable to move on their own. In a typical use situation, a patient is loaded onto the stair chair 10 (when the stair chair 10 is in its fully-unfolded state), the stair chair 10 is wheeled to the head or foot of a flight of stairs, and the stair chair 10 is then carried by two or more persons down or up the flight of stairs. Once any stairs have been navigated, the stair chair 10 is then wheeled further, either to additional stairs, to an ambulance, or to some other location where the patient is removed from the stair chair 10. Stair chairs 10 are often used in emergency situations where elevator service has been interrupted, is unavailable, or is inadvisable.

BRIEF SUMMARY OF THE INVENTION

Implementations of the invention provide a motorized and tracked sled for attachment to a stair chair to thereby reduce the effort needed to operate a stair chair when ascending or descending stairs or other more challenging terrains. The sled may be lightweight and may be adapted for connection to a variety of currently-existing stair chairs or may be adapted for future stair chair designs. In some implementations, the sled may be removably attached to the stair chair, and may be removed for storage or when the sled is not being used in conjunction with the stair chair. The sled may include a power supply or power source, such as a battery or battery pack, that may be attached to the sled or that may be separately carried to reduce the on-chair weight of the sled. The power supply or power source provides power to a motor driving a track configured to engage a set of stairs. The motor and track may have sufficient power, torque, etc. to lift the stair chair and a patient thereon up one or more flights of stairs, and may also be used in a powered sense while descending stairs.

The track driven by the motor has a length sufficient to simultaneously engage the lips or edges of a pair of sequential steps. Additionally, the track belt may be provided with teeth, grooves, or other features to more securely engage the steps of the stairway. Although the track is sufficiently long to simultaneously engage the lips or edges of two sequential steps, the track may be otherwise limited in length to reduce the weight of the track. Therefore, to ensure that the sled and attached stair chair are stably supported while ascending or descending stairs, one or more rails, skis, or passive tracks may be provided on the sled. While the track is of a length to simultaneously engage two sequential steps, the rails, skis, or passive tracks may have a length sufficient to ensure that the rails, skis, or passive tracks are always positioned so as to be over the edge or lip of no fewer than two steps. In other words, the rails, skis, or passive tracks may have a length sufficient to simultaneously be positioned over the edges of at least three sequential steps.

The sled may be configured so as to be able to fold up against the stair chair when the sled is not in use, to permit the stair chair to be more easily pushed across flat surfaces using the stair chair's wheels. The sled may be sufficiently lightweight to permit the stair chair to be carried in a fashion currently common with stair chairs even when the sled is attached to the stair chair. Such carrying may occur when the sled is folded up against the chair in a stowed position. When the sled is in a deployed position, it may have any desired angle relative to the back of the stair chair, and such angle may be chosen to match the angle typically found in stair chairs being carried.

In some implementations, the sled essentially forms a single unit that is removably attached to the stair chair. In other implementations, the sled is formed from readily-separable parts that may form separate functional units. For example, the sled may be formed from two units, the first unit being a powered track unit that serves a function of providing powered movement up and/or down stairways, and the second unit being a non-powered frame that serves a function of permitting non-powered stair-contacting movement up and/or down stairways. Such embodiments may be useful for reducing total weight of the stair chair and sled unit when ascending stairs and/or for separating portions of the stair chair and sled unit to maximize power supply life during extended use periods.

These and other features of the implementations of the invention will become clear through practice of the implementations of the invention and through the following description and appended drawings, which are incorporated by reference. The foregoing and following description is not intended to be limiting, and the scope of the invention should be determined by reference to the claims.

BRIEF DESCRIPTION OF THE SEVERAL VIEWS OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

FIGS. 7-11 illustrate features of a representative continuous track belt for use with embodiments of the invention;

DETAILED DESCRIPTION OF THE INVENTION

Figure 1:
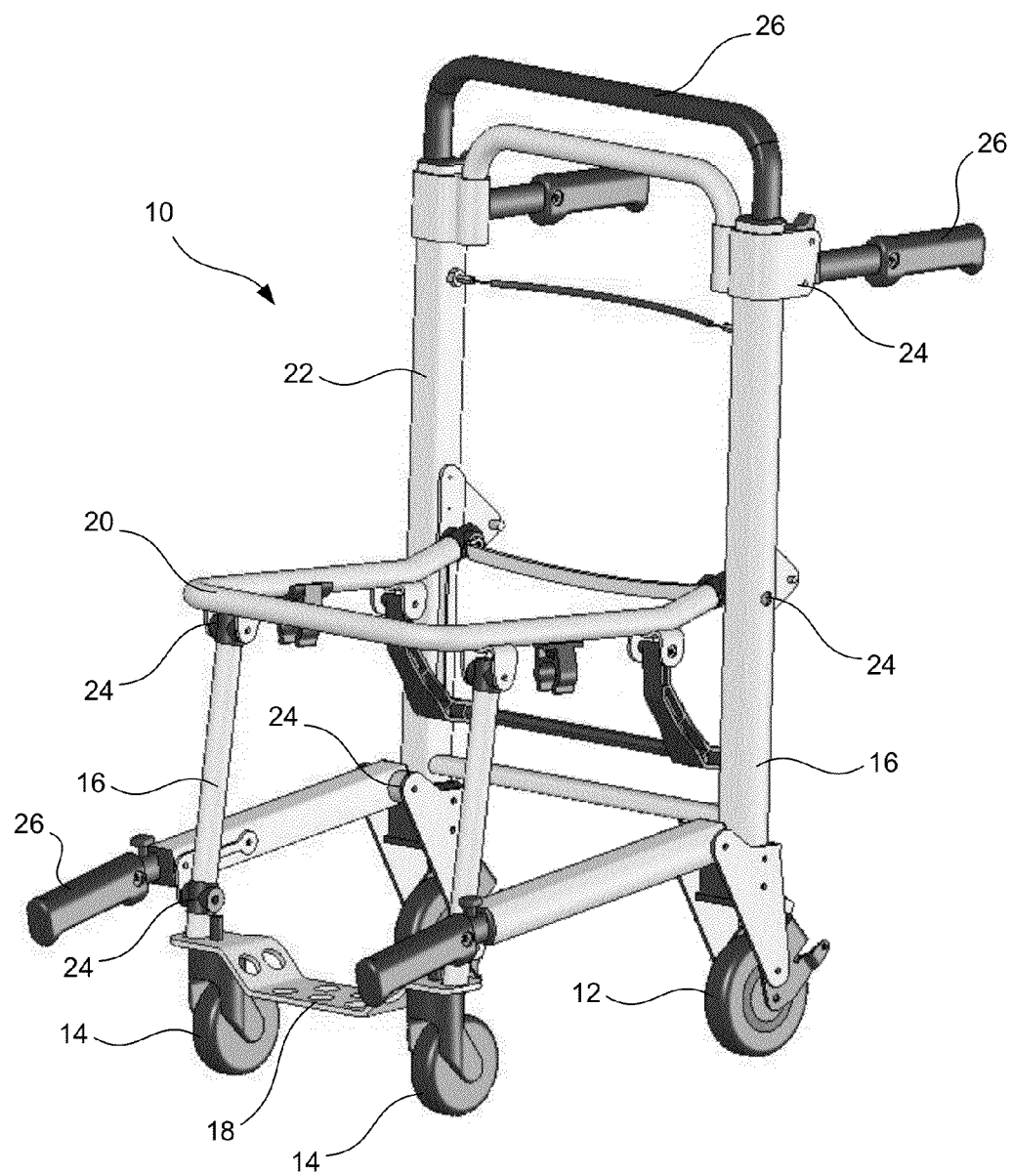
FIG. 1 is a perspective view of a prior-art stair chair.

A description of embodiments of the present invention will now be given with reference to the Figures. It is expected that the present invention may take many other forms and shapes, hence the following disclosure is intended to be illustrative and not limiting, and the scope of the invention should be determined by reference to the appended claims.

Embodiments of the invention provide a motorized and tracked sled for attachment to existing stair chairs. The sled may be lightweight and may be adapted for connection to a variety of currently-existing stair chairs or may be adapted for future stair chair designs. In some embodiments, the sled may be removably/readily-reversibly attached to the stair chair, and may be removed for storage, for when the sled is not being used in conjunction with the stair chair, or when it is desired to move the stair chair in a lighter-weight configuration. The sled may include a power supply or power source, such as a battery or battery pack, that may be attached to the sled or that may be separately carried to reduce the on-chair weight of the sled. The power supply or power source provides power to a motor driving a track configured to engage a set of stairs. The motor and track may have sufficient power, torque, etc. to lift the stair chair and a patient thereon up one or more flights of stairs, and may also be used in a powered sense while descending stairs.

The track driven by the motor has a length sufficient to simultaneously engage the lips or edges of a pair of sequential steps. Additionally, the track belt may be provided with teeth, grooves, or other features to more securely engage the steps of the stairway. Although the track is sufficiently long to simultaneously engage the lips or edges of two sequential steps, the track may be limited in length to reduce the weight of the track. Therefore, to ensure that the sled and attached stair chair are stably supported while ascending or descending stairs, one or more rails, skis, passive tracks, or other stair-engaging portions, may be provided on the sled. While the track is of a length to simultaneously engage two sequential steps, the rails, skis, passive tracks, or other stair-engaging portions may have a length sufficient to ensure that the rails, skis, passive tracks or other stair-engaging portions are always positioned so as to be over the edge or lip of no fewer than two steps. In other words, the rails, skis, passive tracks, or other stair-engaging portions may have a length sufficient to simultaneously be positioned over the edges of at least three sequential steps.

The sled may be configured so as to be able to fold up against the stair chair when the sled is not in use, to permit the stair chair to be more easily pushed across flat surfaces using the stair chair's wheels. The sled may be sufficiently lightweight to permit the stair chair to be carried in a fashion currently common with stair chairs even when the sled is attached to the stair chair. Such carrying may occur when the sled is folded up against the chair in a stowed position. When the sled is in a deployed position, it may have any desired angle relative to the back of the stair chair, and such angle may be chosen to match the angle typically found in stair chairs being carried.

In some embodiments, the sled essentially forms a single unit that is removably attached to the stair chair. In other embodiments, the sled is formed from readily-separable parts that may form separate functional units. For example, the sled may be formed from two units, the first unit being a powered track unit that serves a function of providing powered movement up and/or down stairways, and the second unit being a non-powered frame that serves a function of permitting non-powered stair-contacting movement up and/or down stairways. Such embodiments may be useful for reducing total weight of the stair chair and sled unit when ascending stairs and/or for separating portions of the stair chair and sled unit to maximize power supply life during extended use periods.

In at least one embodiment, the sled includes a motorized track configured to engage steps of a staircase and a first stair-engaging portion configured to at least intermittently contact steps of the staircase while the motorized track is engaging steps of the staircase. In some embodiments, the motorized track includes a continuous track portion. The continuous track portion may include teeth to engage stairs or another surface, or it may be made of a soft material to engage stairs or another surface. The continuous track may loop around one or more pulleys as well as a drive gear operative connected to a motor. The motor is powered by a power supply, which may include a battery (whether fixed or removable/replaceable) or a plug or wire connected to an external power source.

While some embodiments include only a first stair-engaging portion, other embodiments include two or more stair-engaging portions. Where two stair-engaging portions are present, they may be located on opposite sides of the motorized track. In some embodiments, the stair-engaging portions are elongate portions or members, so they can contact or be over the edges of multiple steps of a stairway simultaneously. The stair-engaging portion or portions may include rails, skis, passive (non-motorized) tracks (with or without one or more brakes or brake systems) that may include continuous tracks, or any other member that sufficiently engages the steps of the stairway at least intermittently to stabilize the stair chair/sled as the steps are being ascended or descended. Each stair-engaging portion or portions may have a long axis that is substantially parallel to a long axis of the motorized track.

Where the stair-engaging portion (or portions) is a rail, ski, or similar structure, it may include a substantially-planar portion for resting on the steps. It may also include an upturned portion on one or both ends to facilitate moving the rail, ski, or similar structure over the edge of a next step of the staircase. The rail, ski, or similar structure may include or be faced with a high-durability, low-friction material at least on a step-contacting surface of the rail, ski, or similar structure. Such materials include, for example, ultra-high molecular weight polyethylene, high density polyethylene, polytetrafluoroethylene, and polyfluoroethylene. Where the stair-engaging portion (or portions) is a passive track, the passive track may include similar substantially-planar and upturned portions defined by at least a portion of the path of the track.

To ensure that the motorized track securely engages the steps of the stairway, at least a portion of the motorized track may extend step-ward or stair-ward past a stair-ward-most portion of the stair-engaging portion or portions. Thus, even when the stair-engaging portion or portions is/are contacting the edges of the steps, the motorized track securely engages the edges of one or more steps at all times. The motorized track may extend stair-ward past the stair-engaging portions a distance between approximately 0.5" to 0.7" (approximately 13 mm to 18 mm), or approximately 0.6" (approximately 15 mm). The portion extending stair-ward past the stair-engaging portions may include one or more teeth of a continuous track.

The motorized track may have a length sufficient to ensure that the motorized track is capable of simultaneously engaging the edges of at least two sequential steps of a representative stairway, such as a stairway of maximum-anticipated step spacing. This ensures that during a stairway ascent or descent, the motorized track is always engaged with at least one step. This prevents situations where the stair chair could begin to slide down the stairway uncontrolled. Similarly, the stair-engaging portion or portions may have a length sufficient to ensure that the stair-engaging portion is capable of simultaneously engaging the edges of at least three sequential steps of a representative stairway, such as a stairway of maximum-anticipated step spacing. This ensures that during a stairway ascent or descent, the stair-engaging portion or portions are always positioned over the edges of at least two steps, thus limiting potentially-unwanted forward or backward rocking of the stair chair and motorized sled as an ascent or descent is occurring.

At least some embodiments of the motorized sled are adapted to be reversibly attachable to the stair chair, so as to permit the sled to be attached to and detached from the stair chair as desired. For example, the motorized sled may be attached to the stair chair for transport of patients, but removed for more-compact storage. As another example, the motorized sled may also be detached while an empty stair chair is carried up one or more flights of stairs and the sled may be carried separately. This may be advantageous in a situation where multiple people are to be evacuated, and it is desired to minimize use of the power supply of the sled to those times where powered ascent/descent is needed. The separation of the stair chair and the sled permits the sledded stair chair to be separated into several lighter-weight components.

The sled may also be foldable from a deployed position to a folded position to permit compact storage of the stair chair and attached sled. Therefore, at least one attachment point between the stair chair and the sled may include a movable attachment, such as a pivoting, bending, or folding attachment. To support the sled at a proper angle with respect to the stair chair when in the deployed position, the sled may be attached to the stair chair at another location with a brace or other structure.

Therefore, the sled may be reversibly attached to the stair chair at several points. For example, the sled may include an attachment mechanism for attaching a lower end of the sled to a stair chair. The attachment mechanism may be any mechanism known in the art, including hinges, quick-release attachments, pivoting attachment mechanisms, bolts, rivets, pins, etc. An upper attachment mechanism may attach an upper or middle portion of the sled to the stair chair in such a way as to maintain one or more desired angles of the sled with respect to the stair chair Such attachments may include single- or multi-position locking/folding bars, telescoping connections, systems including one or more hydraulic/pneumatic elements, or any other mechanism known in the art.

Some embodiments, to further facilitate flexible use of the stair chair and sled, may permit detachment of all or a portion of the motorized track from the sled. Such embodiments include at least two stair-engaging portions to ensure that the stair chair is supported against unwanted side-to-side motions, unless at least a track of the motorized track remains attached to the sled. In some such embodiments where an on-board power supply (such as a battery) is provided, the on-board power supply is removable, but may still remain electrically connected to the motorized track. In other embodiments, the power supply and a motor of the motorized track is removable. In still other embodiments, the entire motorized track is removable, either as a unit or in various components. Removal of all or a portion of the motorized track permits lightening of the stair chair for transport or other purposes, either while engaging in a power-assisted ascent or descent (power supply removed but still electrically connected) or while engaging in an ascent or descent without any powered assist.

Figure 2:
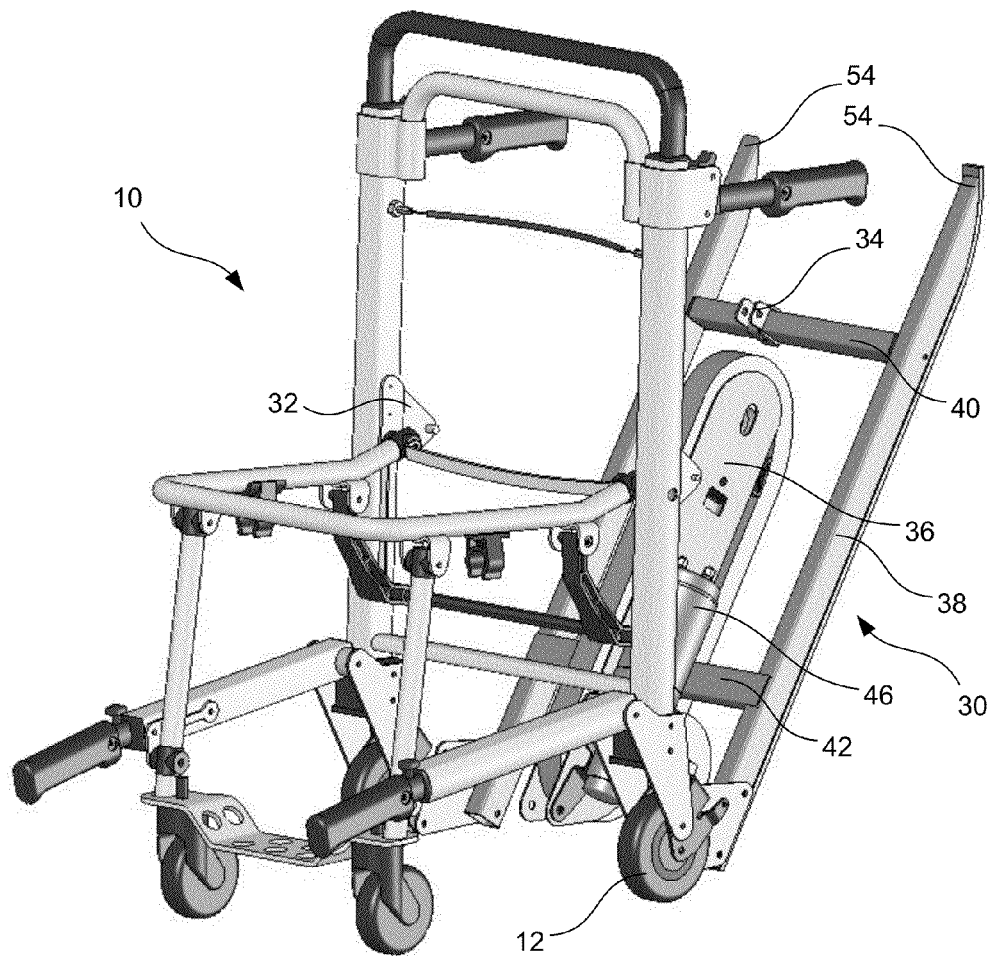
FIG. 2 is a perspective view of a motorized sled attached to a stair chair.
Figure 3:
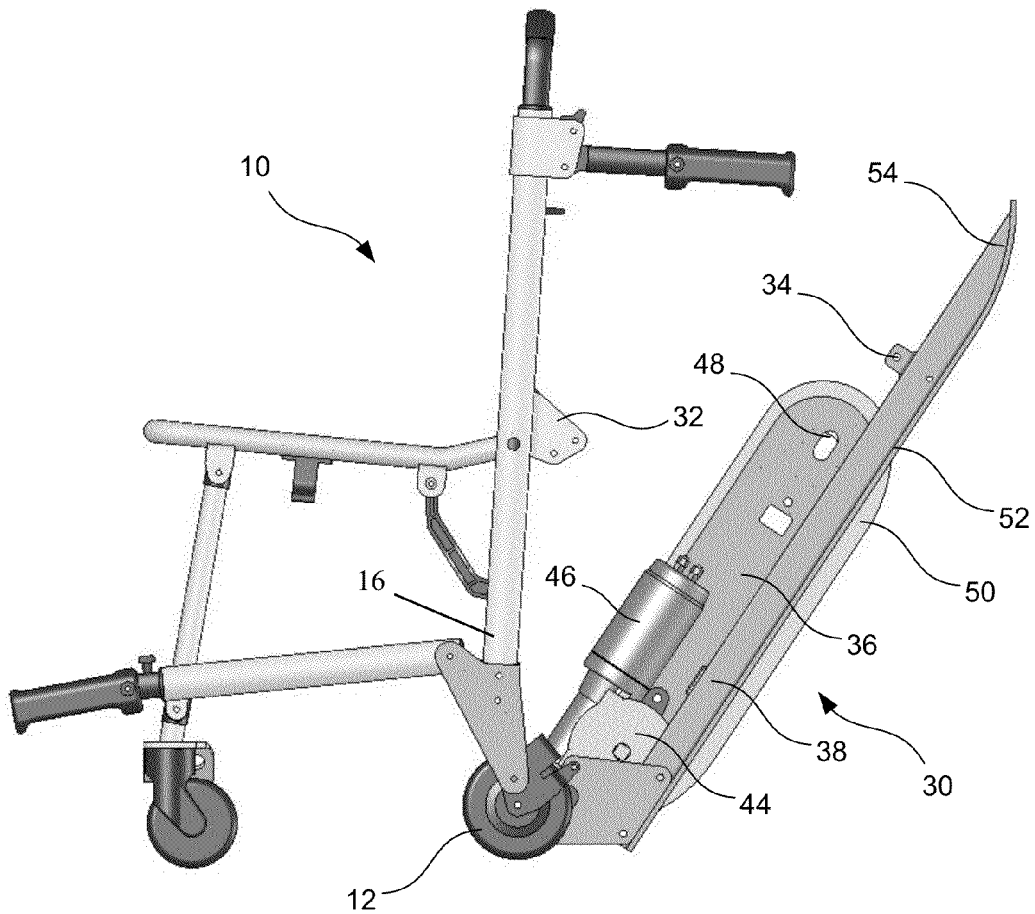
FIG. 3 is a side view of a motorized sled attached to a stair chair.
Figure 4:
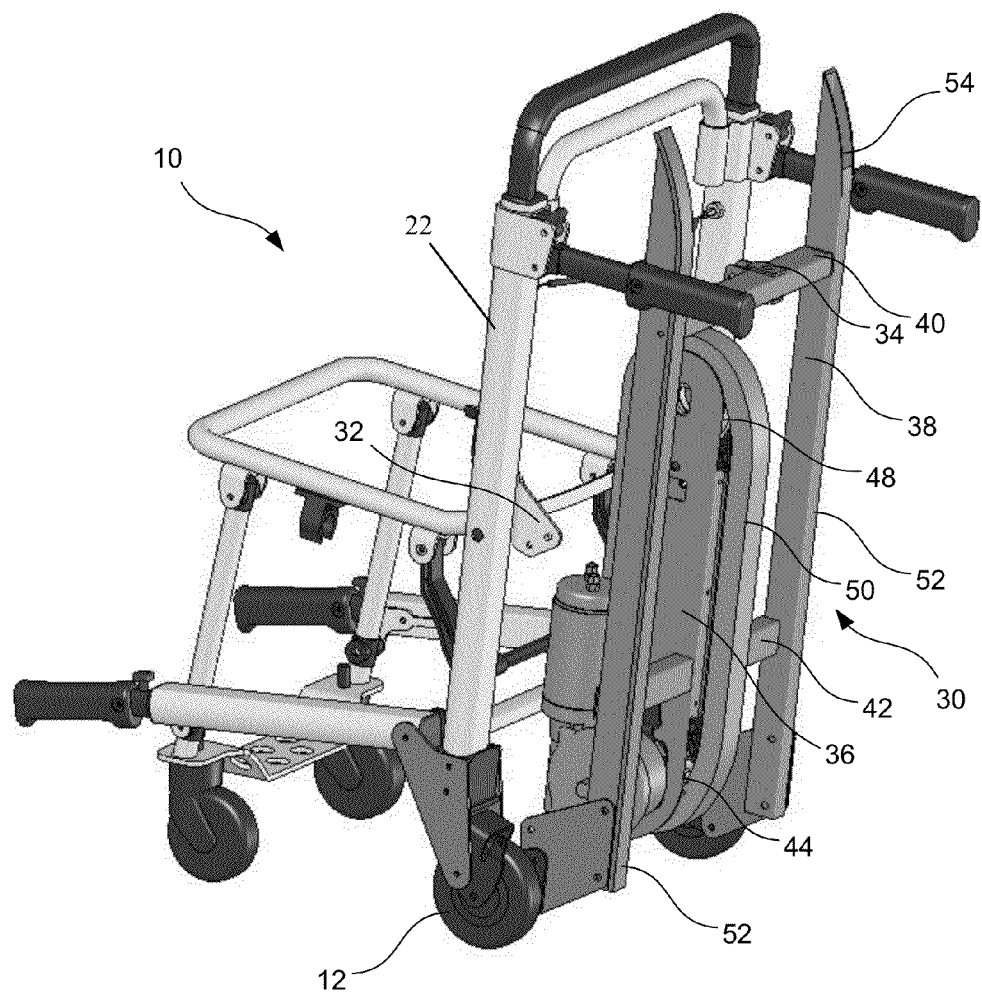
FIG. 4 is a perspective view of a motorized sled attached to a stair chair in a stowed position.

One embodiment of a sled 30 is depicted in FIGS. 2-4 attached to a stair chair 10. The stair chair 10 is substantially similar to the stair chair 10 illustrated in FIG. 1. This use with an existing stair chair 10 illustrates that embodiments of the sled 30 may be adapted for use with essentially any stair chair 10, including current and future stair chairs 10. Therefore, as the details of the stair chair 10 have previously been discussed, they are not specifically discussed with respect to FIGS. 2-4. One end of the sled 30 may be attached to the stair chair 10 proximate the rear wheels 12 of the stair chair 10. The attachment of the sled 30 to the stair chair 10 proximate the rear wheels 12 may be a hinged-type or pivot-type attachment, allowing the sled 30 to be rotated between a deployed, stair-engaging position and a stowed (or folded) position proximate the back 22 of the stair chair 10. In either position, the sled does not interfere with the use of the bearings on the stair chair so that the mechanism for transporting the stair chair may be quickly transitioned between the bearings and the sled.

Although not specifically illustrated in FIGS. 2-4, the sled 30 may have an additional attachment to the stair chair 10 that braces the sled 30 when deployed and that controls the extent of deployment. The additional attachment may be made to the stair chair frame 16 at a deployed attachment point 32 either previously-existing on the stair chair 10 or specifically-attached to the stair chair 10 for this purpose. The support extending between the attachment point 32 and the sled 30 is not shown in the Figures so as not to obscure the other features of the sled 30, but it will be appreciated that a variety of braces, frames, supports, or other structures may be utilized to support the sled 30 (and the stair chair 10 on the sled 30 when on stairs) in the deployed configuration. The sled 30 or the stair chair 10 may also have a stowed attachment point 34 that may reversibly engage a corresponding structure (on the stair chair 10 if the stowed attachment point 34 is on the sled 30 and on the sled 30 if the stowed attachment point is on the stair chair 10) to secure the sled 30 in the stowed position. The stowed position is shown in FIG. 4, while the deployed position is shown in FIGS. 2 and 3.

The sled 30 includes a track 36 and a rail or ski ("rail 38"). The track 36 may include a track belt that is ribbed or includes a plurality of teeth (and thereby form a toothed track belt), as discussed below with respect to FIGS. 7-9, and is illustrated as a continuous looped track belt 50. In the embodiment of FIGS. 2-4, the track 36 is located on the sled 30 between two rails 38. In other embodiments, the track 36 may be placed to one side of the sled 30, and a single rail 38 may be located on the other side of the sled 30. A single track 36 is shown in the illustrated embodiment because the weight of the rail 38 is substantially less than the weight of the track 36. For example, in one embodiment, the rail 38 is manufactured of extruded aluminum or the like and is therefore very light weight. Additionally, the rail 38 simultaneously forms part of a sled frame 40 of the sled 30, further reducing the total weight of the sled 30. In the embodiment of FIG. 2, one or more sled frame braces 42 extend between the rails 38 and the track 36, forming the remainder of the sled frame 40.

The track 36 is attached to the sled frame 40, and includes a drive mechanism or gear ("drive gear 44") attached to a motor 46 and a pulley 48, as best seen in FIGS. 3 and 4. The motor 46 may be a high-efficiency motor and may be attached to the drive gear 44 by one or more gears, drive shafts, etc. as are known in the art. The motor 46 may be powered by a battery or other portable power supply (not shown) that may be attached to the sled 30 or that may be electrically connected to the motor 46, such as by a cable, and that may be carried or worn by a user of the sled 30 and stair chair 10. Having the battery be carried or worn by the user may further reduce the total weight of the sled 30, which may allow for additional duty cycles before the battery must be replaced or recharged. The pulley 48 may include a tensioner to ensure that its continuous track belt 50 is properly tight and will not slip. The various components and materials used for the track 36 may be chosen to reduce the total weight of the sled 30, such as by using aluminum and other light-weight materials where possible.

As discussed above, where there are two rails 38, the track 36 may be centrally located between the rails 38 and therefore inside the sled frame 40 formed by the two rails. The track 36 need not be centrally-located between the rails 38. Instead, the track 36 may be located at any location between the rails 38, including immediately adjacent one of the rails 38. For example, the track 36 may be somewhat offset from the exact center line between the rails 38, and this may provide additional room on one side of the track 36 for the motor 46, power supply (if any) and any associated gears or equipment to be located on the sled 30 adjacent the track 36.

As may be best seen in FIG. 3, the rails 38 (in embodiments having more than one rail 38) may have a bottom surface 52 that is substantially planar over a majority of its length, and the bottom surface 52 of the two rails may be substantially co-planar. This bottom surface 52 may include a low-friction high-durability surface to make the rails 38 slide more easily up and down staircases/stairways. Examples of surfaces that may be used include steel, ultra-high-molecular-weight polyethylene (UHMWPE), high-density polyethylene (HDPE), polyethylene treated with fluorine gas to form a surface layer of polyfluoroethylene (PFE), and polytetrafluoroethylene (PTFE, commonly sold under the trademark Teflon®). The foregoing are merely examples of low-friction, high-durability surfaces, and any such surface may be used in alternate embodiments of the invention. To further facilitate the rails 38 sliding up or down stairs, one or more of the ends of the bottom surfaces 52 may include an upturn 54 or upturned portion. The upturn 54 causes a leading portion of the rails 38 to be elevated in relation to the lower plane of the rails 38, allowing the rails 38 to more-easily engage subsequent steps of a staircase, especially in situations where the spacing of the steps is unequal.

As may also be seen in FIG. 3, a portion of the track 36 extends below the co-planar plane of the rails 38 so as to be able to engage the steps of the staircase. The portion of the track 36 extending below the co-planar plane of the rails 38 may extend below the co-planar plane of the rails 38 a distance between approximately 0.5" and 0.7" (between approximately 13 mm and 18 mm) in some embodiments. In still other embodiments, the portion of the track 36 may extend below the rails 38 a distance of approximately 0.6" (approximately 15 mm).

Track belt 50 may be smooth-surfaced, but some embodiments of the track belt 50 include ribs or teeth to more securely engage the steps. Such embodiments may include very durable and harder materials, while the smooth-surfaced track belts may include softer materials that permit the contour of the steps to deform the track surface so that the track surface more securely engages the steps. In embodiments where the track belt 50 includes a ribbed or toothed track, the valleys of the track belt may lie close to (e.g. slightly above or slightly below) or within the co-planar plane of the rails 38 (while on the flat lower portion of the track belt), while the protruding portions of the track belt 50 may lie substantially below the co-planar plane of the rails 38 to securely engage the steps.

Figure 7:
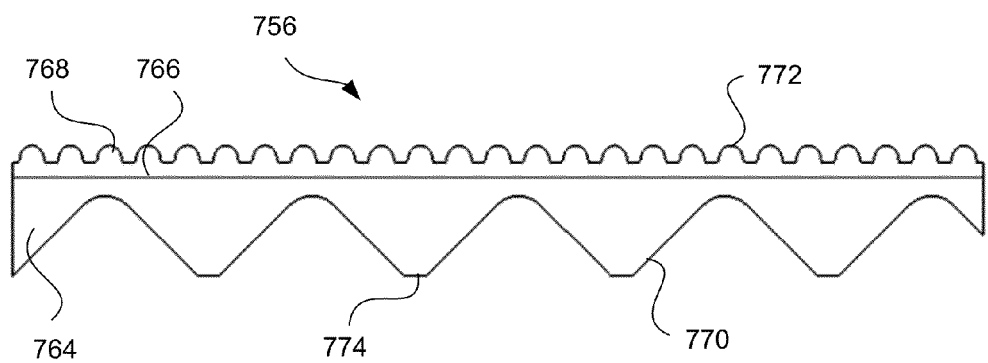
Figure 8:
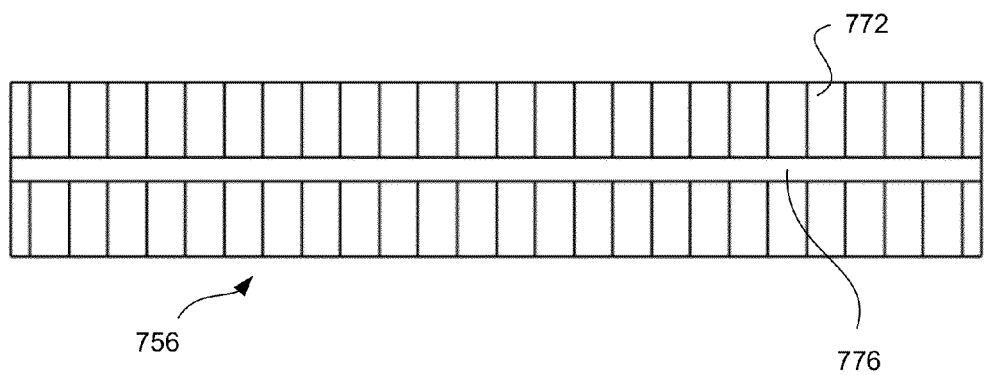

The amount of the projection of the track 36 below the co-planar plane of the rails 38 may be varied to best engage the stairs, and may approximately match the height of the teeth of the track belt 50 (in toothed or ribbed embodiments), as will be set forth in more detail below with respect to FIGS. 7-9. To ensure that the track 36 securely engages the steps throughout the ascent or descent, the continuous track belt of the track 36 may be backed by a slider, which may be formed, for example, from a block of a low-friction and hard material that keeps the flat portion of the track belt flat even while the track 36 is resting on the corners of one or more steps. The slider also helps reduce the friction of the rotating track belt 50, allowing the sled 30 to raise/lower more weight than otherwise possible. The slider may include materials similar to the materials used for the bottom surface 52, including UHMWPE, HDPE, PFE, and PTFE. The width of the track 36 may be varied as desired to achieve desired strength and/or weight characteristics for the track 36 and the sled 30. It is currently envisioned that the track belt width may include widths of between less than 1" to more than 6" (less than 2.5 cm to more than 15 cm).

To keep the total weight of the sled 30 minimal, the length of the track 36 may be limited to an amount sufficient to ensure that the track 36 always engages at least one step. In other words, the length of the track 36 may be limited to an amount sufficient to at least span two steps on a stairway having a maximum step spacing, plus some additional small amount of length for safety. This may be seen with respect to FIG. 5, which illustrates in schematic form the sled 36 on a section of stairs. As may be seen in FIG. 5, a length 56 of the flat portion of the track 36 is slightly longer than a step-to-step spacing 58 of the steps between a first step 64 and a second step 66. This ensures that the track 36 securely engages the upper step before releasing the lower step or vice-versa.

Figure 6:
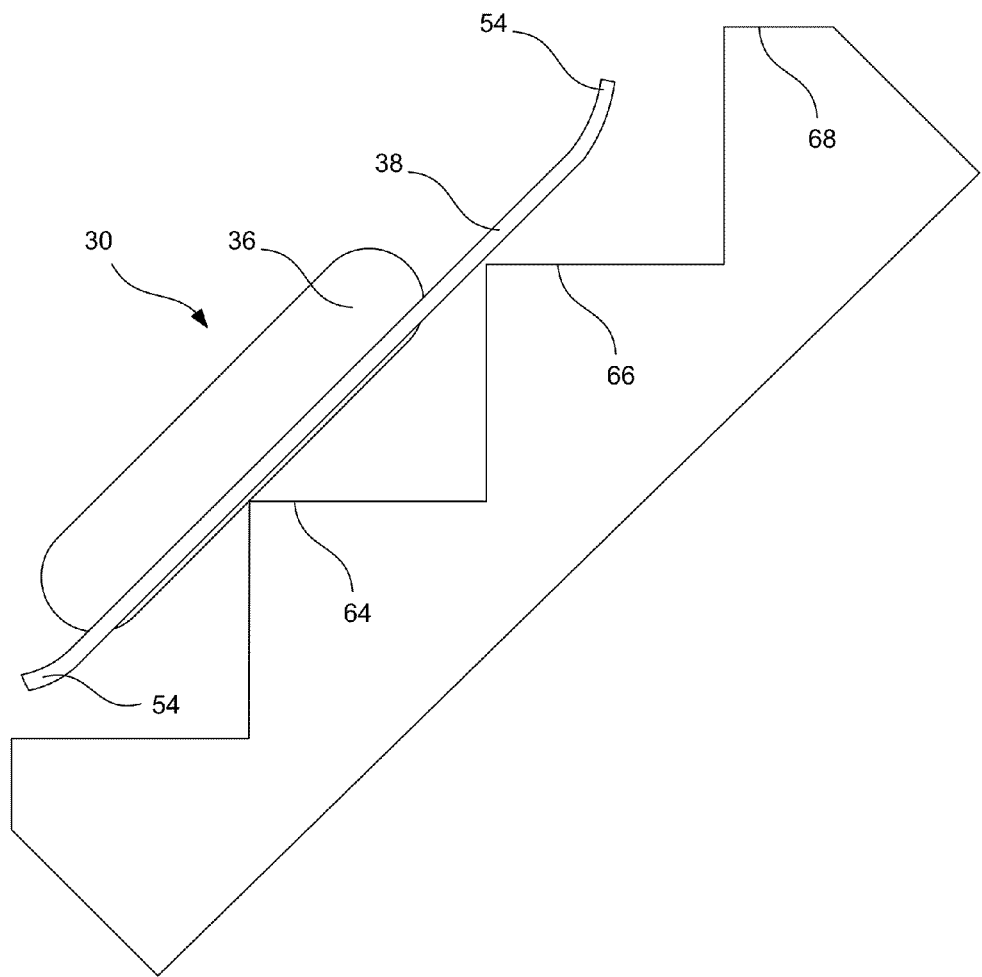
FIG. 6 illustrates engagement of a motorized sled with a flight of stairs.

As the track 36 may be limited in length in some embodiments as set forth above, it will be appreciated that at some points in time, the track 36 may only be engaging a single step. This is illustrated in FIG. 6. If the limited-length track 36 were the only feature of the sled 30 touching or engaging the steps, the sled 30 might become unstable and be prone to tipping either up or down. However, the rail 38 or rails 38 have a length somewhat longer than the track 36, thereby providing additional stability to the sled 30 and thereby to the stair chair 10. Specifically, the rail 38 or rails 38 may have a length sufficient to always span at least two steps. In other words, the length of the rail 38 or rails 38 may be sufficient to at least span the corners of three steps on a stairway having the maximum step spacing, plus some additional small amount of length.

Figure 5:
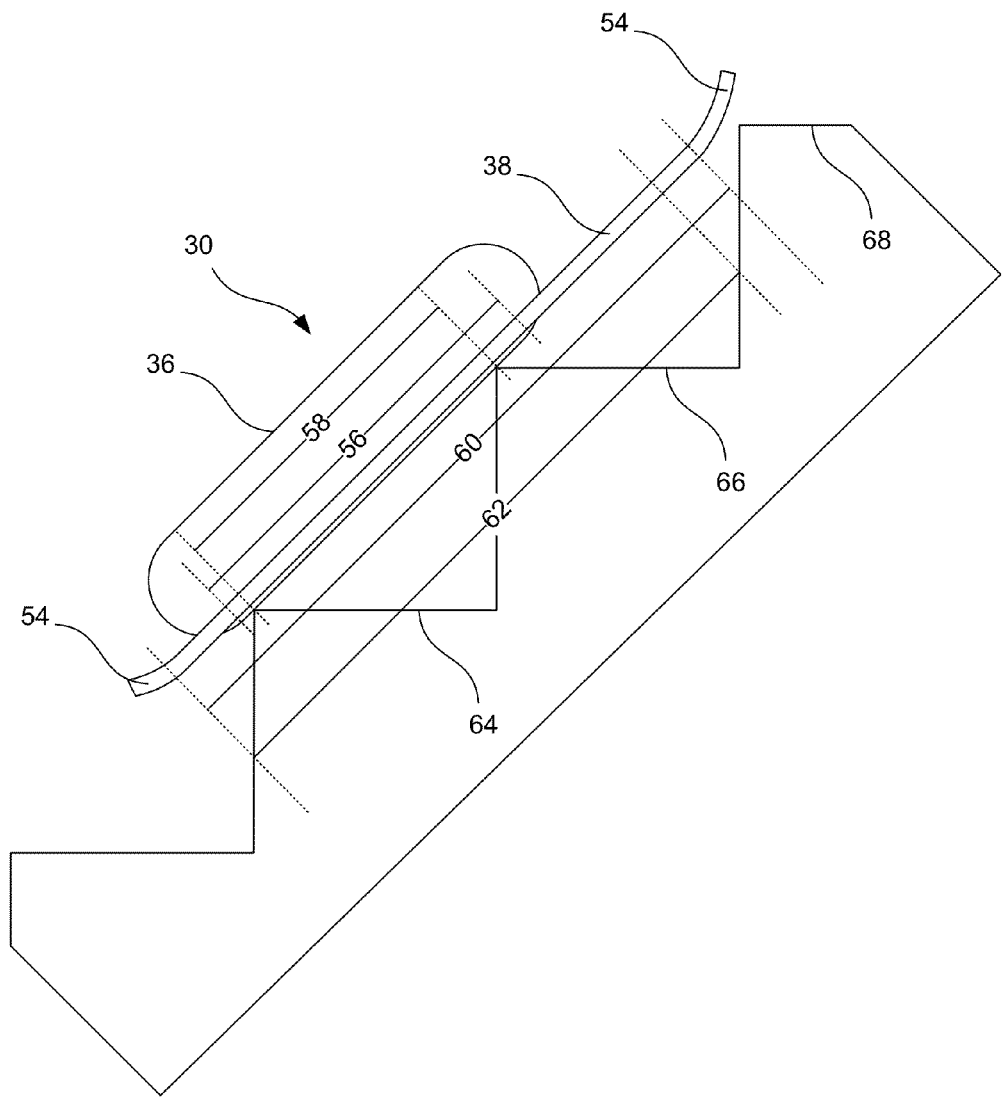
FIG. 5 illustrates engagement of a motorized sled with a flight of stairs.

This may be appreciated with respect to FIG. 5. In FIG. 5, a length 60 of the rail 38 is at least slightly longer than a step-to-step spacing 62 between the first step 64 and a third step 68. With this length 60, the rail 38 will never be over fewer than two steps, and the user of the sled 30 and attached stair chair 10 can ensure stability of the ascending or descending stair chair 10 and sled 30 by pulling back somewhat on the top of the back 22 of the stair chair 10, such as at the handles 26 of the back 22. FIG. 6 illustrates how the rail 38 always engages at least two steps and also makes clear how a user applying a force at the back 22 in the direction of the stairs can keep the rail 38 in contact with at least two stairs, even when the track 36 is only in contact with one stair.

Reference to FIG. 6 will also illustrate how an embodiment of the sled 30 having a single rail 38 on one side and a single track 36 on the other side can remain stable during an ascent or descent of a flight of stairs. The track 36 always contacts at least one step on one side of the sled 30, while the rail 38 always contacts at least two steps on the other side of the sled 30. The rail 38 provides front-to-back stability, while the rail 38 and track 36 provide side-to-side stability. A user of a one-track-one-rail sled 30 may need to apply some sideways force to the stair chair 10 to compensate for the fact that the motorized track 36 applies stair climbing force exclusively on one side of the sled 30 in such embodiments, but it is anticipated that such embodiments may provide further alternatives for reducing the weight of the sled 30.

As discussed above, some embodiments of the track belt 50 may be ribbed to improve security of the track 30 when ascending or descending irregular surfaces such as stairs. One embodiment of a continuous track belt 756 for use with the track 30 is illustrated in more detail in FIGS. 7-11. FIGS. 7-11 illustrate a section of the continuous track belt 756 used with the track 30. As may be seen by reference to FIG. 5, embodiments of the continuous track belt 756 form a loop around the drive gear 44 and pulley 48. The drive gear 44 is connected to the motor 46 and associated drive unit and provides power to the continuous track belt 756. As discussed above, along the remainder of its length, the continuous track belt 756 may ride along a low-friction slider that may be manufactured of a plastic such as UHMWPE, HDPE, or LDPE. Use of the low-friction slider has been found to improve efficiency of the track 30, allowing the sled 30 to lift approximately 60% more weight up inclined surfaces such as stairways.

Returning now to FIG. 7, the Figure shows a plan view of a small section of the continuous track belt 756, showing one embodiment of the repeating profile of the continuous track belt 756. The illustrated section shown is from the bottom, surface-contacting portion of the continuous track belt 756, so the surface of the continuous track belt 756 that contacts the stairway or ground is downward in FIG. 7. The continuous track belt 756 shown has three layers: a tread layer 764, a fiber layer 766, and a drive layer 768. As shown in FIG. 7, the tread layer 764 and the drive layer 768 have teeth or ribs 770 and teeth or ribs 772, respectively. The teeth or ribs 770 of the tread layer 764 engage stairs or other irregular surfaces being ascended or descended for security. The teeth or ribs 770 may have a flattened top 774 to reduce wear by preventing a sharp-peaked top from being irregularly torn during use. The teeth or ribs 772 of the drive layer 768 engage the drive gear 44 to transfer power from the motor 46 and drive unit to the continuous track belt 756. The teeth or ribs 772 may also engage a channel or guide in the drive gear 44, pulley 48, and/or slider to keep the continuous track belt 756 properly aligned during use, as may be appreciated by reference to FIGS. 8 and 9, that show an embodiment of a channel 776 in the continuous track belt 756.

The tread layer 764 and the drive layer 768 may be manufactured from materials such as neoprene, urethane, rubber, and the like. In some embodiments, the tread layer 764 may have a durometer of between approximately 60 A and 70 A and in some embodiments a durometer of approximately 70 A to provide softness and improved wear of the continuous track belt 756. This hardness of the tread layer 764 may provide an extremely long life during use and especially useful for ascending or descending a large variety of stairway configurations. The drive layer 768 may have a higher durometer of between 80 A and 55 D or between 85 A to 95 A, and in some embodiments a durometer of approximately 90 A to maintain flexibility but provide tooth strength for interaction with the drive gear 758.

The fiber layer 766 provides strength to the continuous track belt 756 and prevents undue expansion or stretching of the continuous track belt 756 when loaded. The fiber layer 766 may include high-strength durable fibers such as steel fibers, polyesters, fiberglass, or long molecular chains of poly-paraphenylene terephthalamide produced from a condensation reaction between monomers of 1,4-phenylene-diamine(para-phenylenediamine) and terephthaloyl chloride, and commonly sold by E. I. du Pont de Nemours and Company as KEVLAR®. The fiber layer 766 provides tensile strength to the continuous track belt 756 so that the continuous track belt 756 can withstand large tensile loads as the sled 30 is used to ascend or descend stairways. By way of example, and not limitation, the illustrated embodiment of the continuous track belt 756 can withstand between 100 and 2,000 inch/lbs of torque.

By way of example and not limitation, one embodiment of the continuous track belt 756 will be illustrated with reference to FIG. 11 in specific detail. It is anticipated that one or more of the measurements discussed herein may be modified and still fall within the scope of the present invention. In the illustrated embodiment, the continuous track belt 756 may have a height of approximately 0.95" to 1.16" (24.1-29.5 mm) or between 1.05" to 1.06" (26.7-26.9 mm), as measured from the tip (i.e. the flattened top 774) of teeth or ribs 770 to the tip of teeth or ribs 772. This height may be varied for reasons of weight or strength of the continuous track belt 756. The teeth or ribs 772 may have a tooth-to-tooth spacing of approximately 0.28" to 0.35" (7.1-8.9 mm) or 0.31" to 0.32" (7.9-8.1 mm) or of approximately 0.315" (8 mm), and with such a spacing, the drive gear 44 and pulley 48 may have a diameter of approximately 4" (100 mm). As may be appreciated by one of skill in the art, varying the size and spacing of the teeth or ribs 772 may permit or require varying the size of the drive gear 44 and pulley 48 accordingly.

The teeth or ribs 770 may have a tooth-to-tooth spacing of approximately 1.51" to 1.84" (38.4-46.7 mm) or of 1.67" to 1.68" (42.4-42.7 mm), or of approximately 1.675" (42.5 mm). The height of the teeth or ribs 770 from a valley 778 to the flat top 774 may be approximately 0.54" to 0.66" (13.7-16.8 mm) or approximately 0.59" to 0.61" (15.0-15.5 mm) or approximately 0.6" (15.2 mm). These tooth-to-tooth spacings and teeth heights have been found to function well at securely climbing and/or descending a wide variety of stairway configurations, rises, runs, and step spacings. The valley 778 of the teeth or ribs 770 may be provided with a curve, and the radius of curvature of the valley 778 may be approximately 0.22" to 0.28" (5.6-7.1 mm) or approximately 0.25" (6.4 mm). As indicated previously, the teeth or ribs 770 may be provided with the flattened top 774 to reduce wear, and the flattened top 774 may have a width of approximately 0.17" to 0.21" (4.3-5.3 mm) or approximately 0.19" (4.8 mm).

Figure 12:
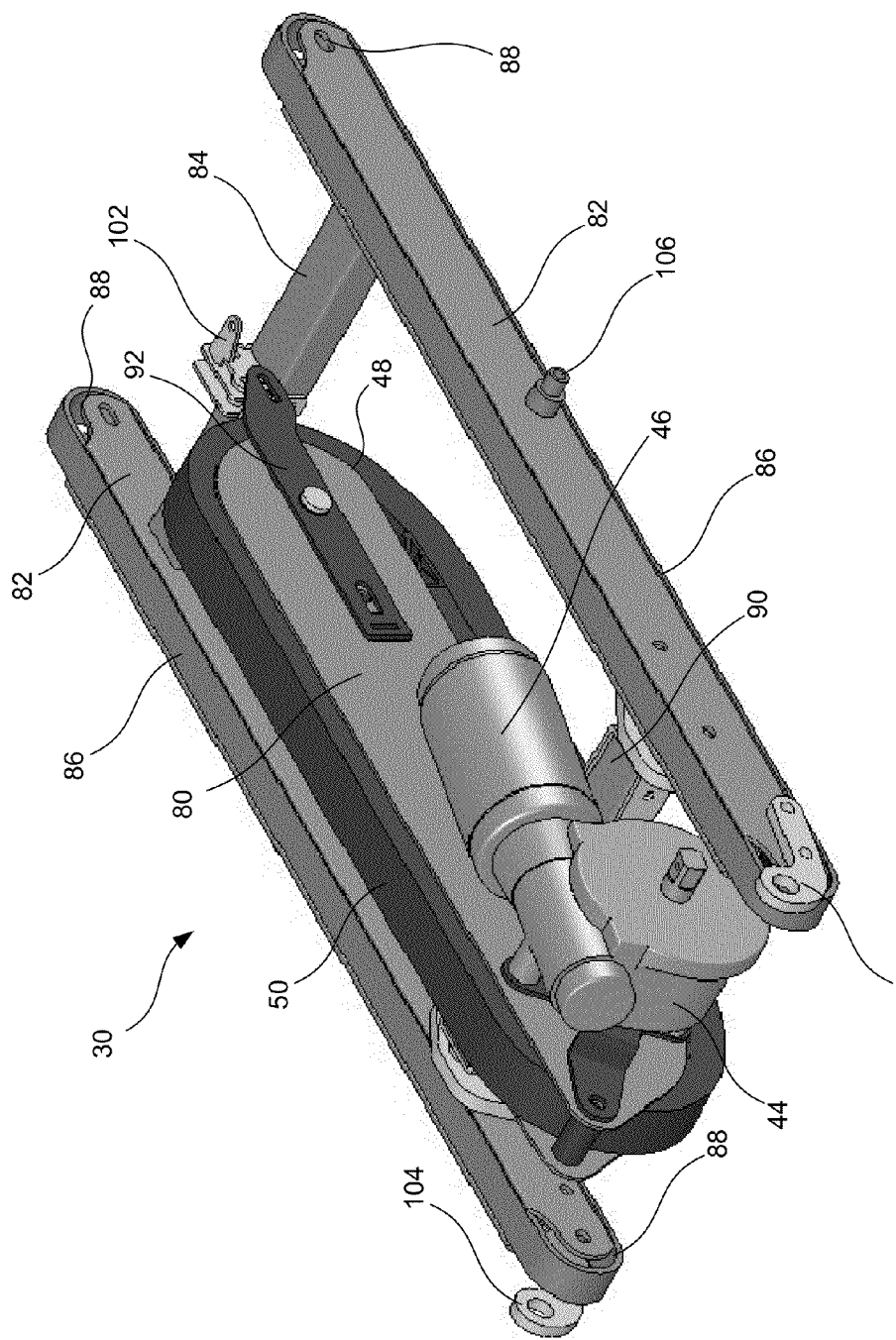
FIG. 12 is a perspective view of an alternate embodiment of a motorized sled.
Figure 13:
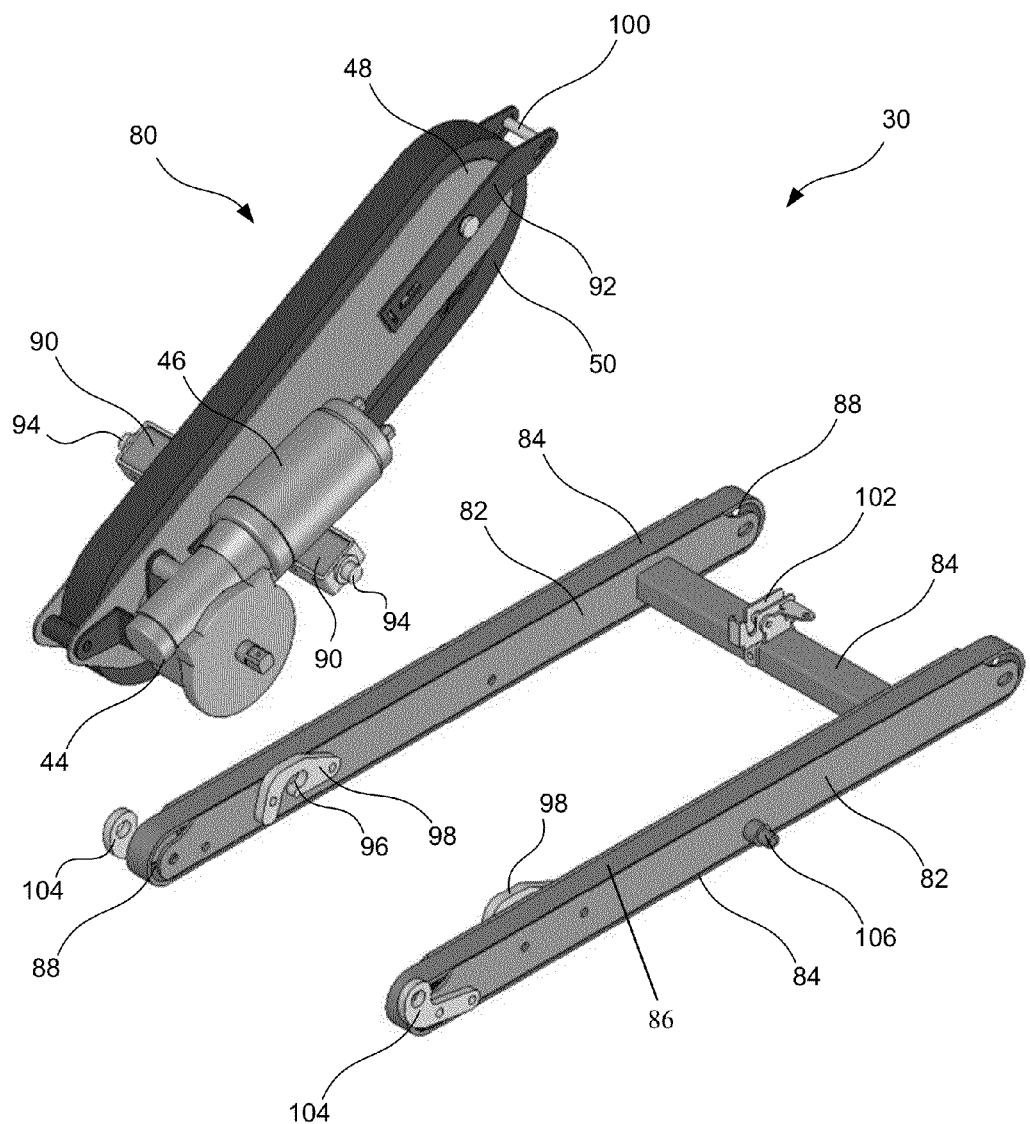
FIG. 13 is a perspective view of the embodiment of FIG. 12 with a motorized track portion separated from the remainder of the sled.

Another embodiment of a sled 30 is depicted in FIGS. 12-15. In FIGS. 12-13, the embodiment of the sled 30 is shown detached from the stair chair 10, while in FIGS. 14-15, the sled 30 is shown attached to the stair chair 10. In this embodiment, the sled 30 is readily separable into at least two components: in FIGS. 12 and 14 all components are shown assembled/connected to each other, and in FIGS. 13 and 15, the sled is shown with a removable powered track 80 removed from the sled 30. As the stair chair 10 is similar to the stair chairs 10 already discussed, and as the embodiment of the sled 30 depicted in FIGS. 12-15 is intended to be usable with a wide variety of stair chairs 10, the details of the stair chair 10 are not discussed with respect to these Figures.

In this embodiment of the sled 30, the rails 38 have been replaced by a pair of elongate passive tracks 82 connected to each other by an upper transverse support 84, as is most clearly illustrated in FIG. 13. Each passive track 82 includes a continuous looped track belt 86 supported by end pulleys 88 at each end. The end pulleys cause a lower surface of the continuous track belt 86 to bend upward on each end of the passive tracks 82, thus achieving an upturned end similar to the upturn 54 for ease of engaging of subsequent steps as the sled 30 and stair chair 10 move up or down a staircase. The passive tracks 82 may also be provided with rollers, pulleys, or a low-friction surface just under the stair-contacting portion of the continuous tracks 84, so as to support the continuous tracks 84 as the edges of the steps move with respect to the passive tracks 82. The continuous tracks 84 may be smooth-surfaced, or may be provided with teeth or ribs to engage the steps of the stairways. As the passive tracks 82 do not need to actively power the sled 30 and stair chair 10 up flights of stairs, some embodiments of the continuous tracks 84 of the passive tracks 82 have teeth or ribs having a smaller profile than may be provided to the continuous track belt 50 of the powered track 80, which may be essentially similar to the continuous track belt 50 discussed above in all regards and all specifically-described or potential embodiments.

Many of the features and components of the powered track 80 may be essentially similar to the track 36 discussed above, with the exception that the powered track 80 is made to be readily-removable from the sled 30. For example, the powered track 80 may include the drive gear 44, the motor 46, the pulley 48, and the continuous track belt 50. Therefore, the extended discussion with relation to such features and embodiments is not repeated at this point, but is instead incorporated by reference. In the illustrated embodiment, the powered track 80 (including, by way of example only, the drive gear 44, the motor 46, the pulley 48, and the continuous track belt 50 as a unit) is removable mounted to the sled 30 by way of a set of laterally extending supports 90 with mounting pins 94 that are received in a pair of brackets or mounts 98 that are fixedly attached, in the illustrated embodiment, to tracks 82. Additionally, the powered track 80 is provided with a frame mount 92 formed by a pair of brackets, which are mounted to track 80 on one end and interconnected at their distal ends by a transverse bar or cross piece 100. Supports 90 pivotally mount the driven end of track 80 between tracks, with cross piece 100 providing an engagement surface for a latch assembly, as more fully described below, for mounting the distal end of the powered track 80 to the sled frame.

Each of the pins 94 is oriented to be received in a corresponding receiving slot 96 of a respective mount 98, which mounts are mounted to the inwardly facing sides of passive tracks 82. Cross piece 100 is then engaged by latch assembly 102 attached to the upper transverse support 84, which includes a recess to receive cross piece 100 and a latch to secure to engage the cross piece in the recess when activated.

The illustrated mounting elements for mounting the powered track 80 to the sled 30 have been provided taking into account the forces to be experienced by the sled 30 and the powered track 80. For example, it will be appreciated, that the powered track 80 should be secured against downward forces that would tend to separate it from the remainder of the sled 30. Therefore, latch assembly 102, the cross piece 100, and the frame mount 92 are designed and manufactured so as to be able to support the weight of the powered track belt 80 and all its components, which may include a power supply (not shown). However, the illustrated receiving slot 96 is oriented differently, and is not designed to support the weight of the powered track 80. Instead, the receiving slot 96 of the lower track mount 98 is oriented with its opening being generally downward, with a solid portion of the lower track mount 98 being oriented upward. This orientation provides strength to the connection between the powered track 80 and the remainder of the sled 30 as the stair chair 10 and sled 30 are in use. When the stair chair 10 and sled 30 are ascending or descending a set of stairs, the weight of the patient or other person being transported is transferred from the stair chair 10 to the sled 30, and is directed generally downward through the lower track mounts 98 through the connecting nubs 94 and thence to the powered track 80, which securely engages the stairs of the stairway. Therefore, the illustrated orientation of the lower track mounts 98 provides strength to the connection between the sled 30 and the powered track 80 during use.

Alternately, the track mounting components, that is the frame mount 92 and the supports 90, may be spaced so that when cross-piece 100 is received by and latched to the latching assembly 102, pins 94 are aligned with the horizontal portion of the slot 96 so that bracket 98 provides support to the track when in the sled is in the deployed position. With this configuration, the distal end of the track is fixed by a pin connection to the frame (at the latching assembly) and the proximal, driven end of the track is supported by brackets 98 but with some limited play in the slot. Moreover, with this the slot configuration—that is with the vertical legs and horizontal legs (as viewed for the orientation shown in FIG. 13), pins 94 can be easily mounted in the brackets through the vertical legs of the slots and then moved into the horizontal legs of the slots to thereby support the driven end of the track while the other end of the track is then latched to the frame to thereby secure the track to the frame. Once the latch is released, the pins can then be moved back in alignment with the vertical legs of the slots so that the pins and hence track can be disengaged from the sled frame.

One way of connecting/disconnecting the powered track 80 to the remainder of the sled 30 will now be described with reference to FIG. 13. To mount the powered track 80 to the remainder of the sled 30 (which may be done with the sled 30 attached to the stair chair 10 or not), the powered track 80 may be brought to a position relative to the remainder of the sled 30 such as illustrated in FIG. 13. The cross piece 100 is maintained above and forward of the upper track mount 102, while the powered track 80 is maneuvered to bring the pins 94 either in front of and then below or behind and then below the lower track mounts 98. Alternatively, the powered track 80 may be rotated along its long axis so that the connecting pins 94 may pass between the lower track mounts and then un-rotated so that the connecting pins 94 are in alignment with and below the lower track mounts 98. Then, the powered track 80 is brought upward (and slightly backward) so that the pins 94 enter into and engage the receiving slots 96, and until pins 94 are fully seated in the uppermost backmost portion of the receiving slots 96.

At this point, the powered track 80 is rotated around pins 94 until the cross piece 100 is engaged by latch assembly 102, which is closed/locked/secured around the cross piece 100, thereby securing the powered track 80 within the sled 30. Separation occurs by way of a substantially reverse process. An alternative mounting/dismounting path passes the powered track 80 substantially from below the remainder of the sled 30, whereby the frame mount 92 passes between the passive tracks 82 forward of the upper spar 84, and then the connections are made as described above.

It should be appreciated that various modifications of the connections between the powered track 80 and the remainder of the sled 30 may be made. By way of example only, other mechanisms may be used to make the connections between the powered track 80 and the remainder of the sled 30. Pins or other structures similar to pins 94 may be provided on the inner sides of the passive tracks 82, and structures similar to mounts 98 may be provided on the ends of supports 90. In such embodiments, it will be appreciated that the orientation of the receiving slot 96 may be modified. In other embodiments, instead of, or in addition to, a frame mount 92, cross piece 100, and latch assembly 102, additional pins 90 may be provided with attachment mechanisms for such mounts.

Other connection mechanisms may be provided other than those specifically illustrated, such as quick-release mechanisms, rotating locks, spring-loaded latches, or any other readily-reversible connection known in the art. Additionally, although the illustrated embodiment has been shown with respect to removing the powered track 80 as a single unit, other embodiments are envisioned whereby one or more components of the powered track 80 may be separately removable. For example, a power supply can be removed separately in some embodiments, a motor unit can be removed separately in some embodiments, and in some embodiments, a power supply/motor unit can be removed separately from a track portion.

Removal of one or more portions of the sled 30 permits use of a lighter-weight configuration when such a lighter-weight configuration is desired. For example, in an evacuation situation where the stair chair 10 and attached sled 30 are to be used repeatedly over a short time period, it may not be feasible to recharge a power supply (e.g. battery) of the sled 30. Therefore, it may be desirable to use the stair chair 10 and sled 30 in a powered sense only when necessary or absolutely necessary, such as when ascending or descending stairs with heavy passengers. When the stair chair 10 and sled 30 are being used with lighter passengers or when the stair chair 10 and sled 30 are being returned to a desired starting point unloaded, a removable portion of the sled 30 (which may include the entire sled 30, the entire powered track 80, a power supply (not shown), or some other removable portion or combination of portions) may be removed and carried separately. To provide more control over stairway descents when, for example, the powered track 80 is removed, one or more of the passive tracks 82 may be provided with a braking system that may be operable from a handle of the stair chair 10.

It should be noted that FIGS. 12-15 illustrate a readily-detachable powered track 80 in conjunction with a pair of passive tracks 82. As it is envisioned that the stair chair 10 may be used for stairway descents (and possibly ascents) without the powered track 80 attached to the sled 30, it is anticipated that at least two passive tracks 82 will be desired for maximum stability of the stair chair 10. However, it is envisioned that it would be possible to have only a single passive track 82, or to have only a single passive track 82 of the illustrated length and to provide a shorter passive track 82 on the other side. Additionally, it is envisioned that one or more passive tracks 82 may be used in conjunction with embodiments not having a readily-removable powered track 80, and that one or more passive tracks 82 (with or without braking systems) may be used in conjunction with the rail 38 (such as with the rail 38 on one side and the passive track 82 on the other side) in both separable and non-separable embodiments.

As mentioned previously, the entire sled 30 may be removable, and may also be foldable with respect to the stair chair 10. Features of the sled 30 are illustrated in FIGS. 12-15 with respect to such folding and removal. The sled 30 includes a pair of lower attachment structures 104 and a pair of upper attachment structures 106 attached to the passive tracks 82. The lower attachment structures are configured for hinged or rotational attachment proximate the rear wheels 12 of the stair chair 10. In removable-sled embodiments, the attachment is readily-reversible. The hinged or rotational attachment permits folding of the sled 30 approximately against the back 22 of the stair chair 10 as previously discussed.

Figure 14:
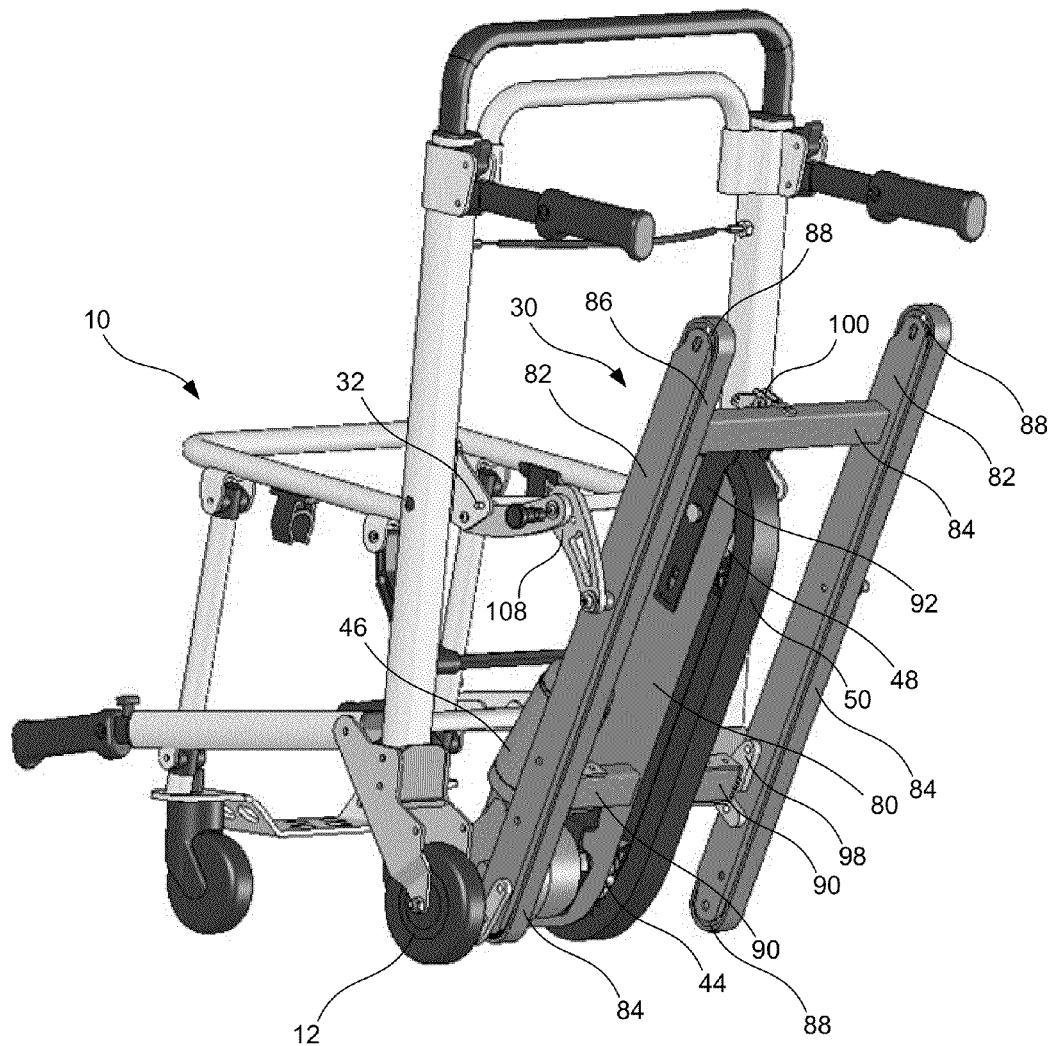
FIG. 14 is a perspective view of the embodiment of FIG. 12 with the motorized track attached to the sled and with the sled attached to a stair chair.
Figure 15:
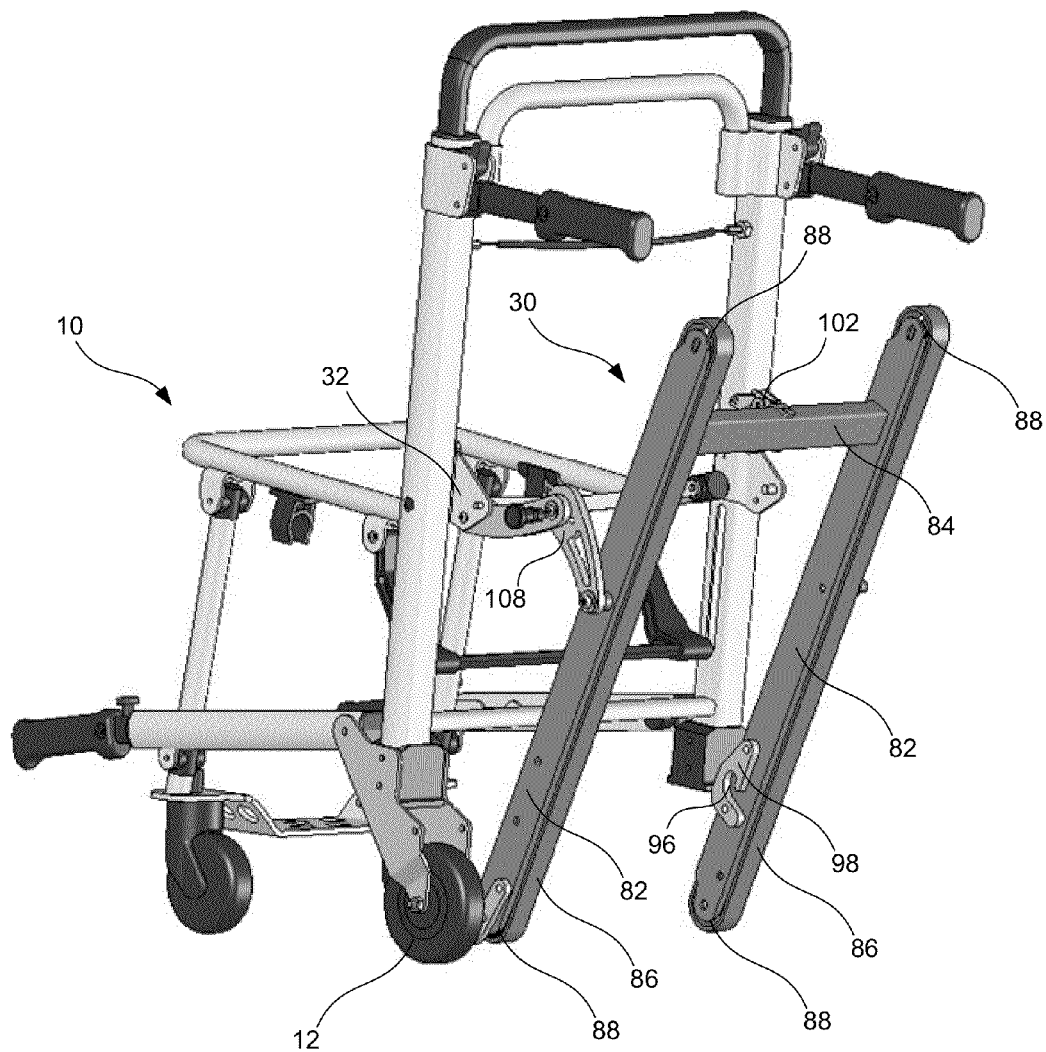
FIG. 15 is a perspective view of the embodiment of FIG. 12 with the motorized track removed from the sled with the sled attached to the stair chair.

The upper attachment structures are attached to the stair chair 10 at the deployed attachment points 32, as previously discussed. FIGS. 14 and 15 illustrate one mechanism for such attachment, namely a folding arm 108. Folding arm 108 includes at least two arm portions that are joined at their respective distal ends by a hinged joint, which when tightened fixes the relative position of the two arm portions. The proximal ends of the respective arm portions are mounted to the stair chair frame 16 by a bracket 32 and to one of the tracks by a pin connection mount. In this manner, the folding arm 108 is selectively lockable in at least two positions (fully-folded and fully-deployed) to thereby secure the sled 30 in the folded and deployed positions. Where additional lockable positions of the folding arm 108 are provided, such positions may permit use of the sled at varying angles for passenger comfort, varying stairway steepness, or any other reasons. Although only one folding arm 108 is illustrated in FIGS. 14 and 15 for clarity, it should be understood that folding arms 108 may be provided on each side between the stair chair 10 and the sled 30. The structures illustrated in the Figures are in all respects intended to be illustrative and not limiting, and reference should be made to the claims to determine the scope of the claimed invention.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed and desired to be secured by Letters Patent is:

1. A motorized sled for attachment to a stair chair including first and second rear wheels, the sled comprising:
    a motorized track configured to engage steps of a staircase; and
    first and second spaced apart stair-engaging portions configured to contact steps of the staircase while the motorized track is engaging steps of the staircase, said first and second stair-engaging portions being pivotably attachable to the stair chair proximate the stair chair rear wheels, wherein the first and second stair-engaging portions comprise first and second rails;
    said motorized track being separately attachable to and detachable from said first and second stair-engaging portions while said first and second stair-engaging portions remain pivotably attached to the stair chair, wherein said motorized track and said first and second stair-engaging portions are pivotable in unison from a generally upright stowed position to a deployed position for engagement with steps of the staircase.

2. The motorized sled as recited in claim 1, wherein the first and second stair-engaging portions have long axes disposed substantially parallel to each other and substantially parallel to a long axis of the motorized track on opposite sides of the motorized track.

3. The motorized sled as recited in claim 1, wherein a portion of the motorized track extends in a stair-ward direction past stair-ward portions of the first and second stair-engaging portions.

4. The motorized sled as recited in claim 1, wherein the first and second stair-engaging portions have a length to permit the first and second stair-engaging portions to simultaneously rest on the edges of three sequential steps of the staircase and the track has a length to permit the track to simultaneously engage two sequential steps of the staircase.

5. The motorized sled as recited in claim 1, further comprising an attachment mechanism for attaching the sled to a stair chair.

6. The motorized sled as recited in claim 1, further comprising a frame, said frame supporting said first stair-engaging portion and said motorized track.

7. The motorized sled as recited in claim 6, wherein said motorized track is removably mounted to said frame.

8. The motorized sled as recited in claim 1, wherein said motorized track includes an engagement surface for engaging steps of a stair case, and at least a portion of said engagement surface positioned below said first stair-engaging portion and said second stair-engaging portion.

9. A motorized stair chair system comprising:
    a stair chair including first and second rear wheels; and
    a motorized sled pivotably attached to the stair chair, the motorized sled comprising:
        a motorized continuous track configured to engage steps of a staircase;
        a power source for powering the motorized track; and
        first and second spaced-apart elongate portions configured to at least intermittently contact steps of the staircase while the motorized track is engaging steps of the staircase, the first and second elongate portions being pivotably attachable to the stair chair proximate the stair chair wheels;
    wherein the motorized track, the power source, and the first elongate portion are attachable and detachable as a unit from the stair chair and are pivotable in unison from a generally upright stowed position to a deployed position for engagement with steps of a the staircase, the motorized track and the power source being separately attachable and detachable as a unit from the stair chair while the first elongate portion remains attached to the stair chair, and the power source being separately attachable and detachable from the stair chair while the motorized continuous track remains attached to the stair chair.

10. The motorized stair chair system as recited in claim 9, wherein the first and second elongate portions have a length to permit the first and second elongate portions to simultaneously contact the edges of three sequential steps of the staircase and the track has a length to permit the track to simultaneously engage two sequential steps of the staircase.

11. The motorized stair chair system as recited in claim 9, wherein the motorized sled is reversibly attached to the stair chair.

12. The motorized stair chair system as recited in claim 9, wherein the motorized sled is configured to fold up against the stair chair when not in use for storage.

13. A method for using a motorized sled with a stair chair to transport a patient comprising:
    attaching a motorized sled as a unit to a stair chair including first and second rear wheels, the motorized sled comprising:
        a motorized continuous track configured to engage steps of a staircase; and
        first and second stair-engaging portions spaced laterally outward of the track and configured to contact steps of the staircase while the motorized track is engaging steps of the staircase, the first and second stair-engaging portions being pivotably attachable to the stair chair proximate the first and second rear wheels;
    placing a patient in the stair chair;
    moving the stair chair to a staircase;
    rotating the motorized continuous track and the first and second stair-engaging portions in unison from an upright stowed position to a deployed position for engagement with the steps of the staircase;
    tipping and moving the stair chair until the motorized continuous track engages a step of the staircase;
    activating the motorized continuous track to move the sled and the stair chair in a direction selected from the group consisting of:
        up the staircase; and
        down the staircase; and
    removing the motorized continuous track from the stair chair while the sled remains attached to the stair chair.

14. A method as recited in claim 13, further comprising repeating the steps of:
    moving the stair chair to a staircase;
    tipping and moving the stair chair until the motorized continuous track engages a step of the staircase; and
    activating the motorized continuous track to move the sled and the stair chair up or down the staircase.

15. A method as recited in claim 13, further comprising:
moving the stair chair while the motorized continuous track is removed from the stair chair.

16. The method as recited in claim 13, further comprising:
removing the sled from the stair chair; and
moving the stair chair while the sled is removed from the stair chair.

17. A sled for attachment to a stair chair having first and second rear wheels, said sled comprising:
- a frame having an upper end portion and a lower end portion, said frame including first and second spaced-apart rails extending from said upper end portion to said lower end portion, wherein said first and second rails comprise an engagement surface spaced from said track to stabilize said sled;
- a quick-release stair chair mount at said lower end portion of said frame for pivotally mounting said frame to a stair chair proximate the stair chair rear wheels, said quick-release mount configured to allow said frame to be pivoted between a deployed position and a generally upright stowed position relative to the stair chair when mounted to the stair chair, and to allow said frame to be separated from the stair chair via actuation of said quick-release mount;
- at least one motorized track provided at said frame for engaging a support surface, wherein said track and said first and second spaced-apart rails are pivotal in unison from the generally upright stowed position to the deployed position for engagement with the steps of a staircase;
- a transverse support coupled to said first and second rails;
- a latch assembly at said transverse support, said latch assembly configured to releasably engage a portion of said motorized track;
- a laterally extending support coupled to said motorized track;
- a motorized track mount coupled to said rails of said frame, said motorized track mount configured to releasably engage said laterally extending support of said motorized track; and
- wherein said latch assembly and said motorized track mount cooperate to releasably secure said motorized track to said rails of said frame, and wherein said laterally extending support disengages from said motorized track mount upon release of said latch assembly.

18. The sled according to claim 17, wherein said track is formed by a closed loop belt around a portion of said frame.

* * * * *